United States Patent [19]

Niemeijer

[11] 4,141,839

[45] Feb. 27, 1979

[54] MULTIHYDROCYCLONE

[75] Inventor: Klaas B. Niemeijer, Veendam, Netherlands

[73] Assignee: Koninklijke Scholten-Honig N.V., Amsterdam, Netherlands

[21] Appl. No.: 773,119

[22] Filed: Feb. 28, 1977

Related U.S. Application Data

[63] Continuation of Ser. No. 542,907, Jan. 22, 1975, abandoned.

[30] Foreign Application Priority Data

Feb. 23, 1974 [DE] Fed. Rep. of Germany ....... 2408767

[51] Int. Cl.[2] ....................... B01D 21/26; B01D 33/02

[52] U.S. Cl. .................................. 210/512 M; 210/84

[58] Field of Search ............... 210/242, 304, 311, 532, 210/512 M, 512 R, 537, 84, 322; 209/144, 211; 55/191, 205, 460

[56] References Cited

U.S. PATENT DOCUMENTS

| | | | |
|---|---|---|---|
| 2,671,560 | 3/1954 | Fontein et al. | 210/512 M |
| 3,543,931 | 12/1970 | Rastetter | 209/211 |

*Primary Examiner*—Frank Sever
*Attorney, Agent, or Firm*—Wenderoth, Lind & Ponack

[57] ABSTRACT

A multihydrocyclone includes a plurality of structural units of parallel-connected hydrocyclones having their overflow pipes and drains opening into respective common headers for overflow fractions and for drain fractions. The headers are each formed by an assembly of discharge conduits which terminate into or combine into collecting conduits having a throughflow area which is at least substantially proportional to the local amounts of flow, so that in the discharge path of the fractions there are no reductions in the flow velocity which would give rise to clogging.

3 Claims, 4 Drawing Figures

MULTIHYDROCYCLONE

This is a continuation of application Ser. No. 542,907, filed Jan. 22, 1975, now abandoned.

BACKGROUND OF THE INVENTION

The present invention relates to a multihydrocyclone comprising a plurality of structural units of parallel-connected by hydrocyclones having their overflow pipes and drains opening into respective headers for overflow fractions and for drain fractions.

In processing starch, particularly from potatoes, it is found that the hydrocyclones have to be regularly laid off and disassembled for cleaning purposes. The headers in known multihydrocyclones have the form of chambers in which the overflow pipes and the drain openings terminate, so that when the respective fractions issue into the chambers there is a reduction in the flow velocity in the chambers. Owing to these relatively low flow velocities in the chambers the walls may become fouled and the accretions formed may come loose, as a result of which the multihydrocyclones will operate less efficiently and even clogging may occur.

SUMMARY OF THE INVENTION

The object of the invention is to provide a multihydrocyclone of the type described above, in which this drawback is avoided.

In accordance with the present invention, therefore, the headers are each formed by an assembly of discharge conduits which terminate into or combine into collecting conduits having a through-flow area which is at least substantially proportional to the local amounts of flow. It is thus achieved that the flow velocity of the effluent fractions within the multihydrocyclone is maintained at the desired high level in substantially all places, so that fouling is substantially prevented.

In a structurally simple embodiment according to the invention the discharge conduits are formed in inserts. According to the invention, the discharge conduits and/or the collecting conduits are preferably constructed at least in part as recesses in parts of the cyclone housing, which offers advantages as regards manufacture.

In a preferred embodiment of the invention the housing of the multihydrocyclone is constructed as a cylinder having a central transverse partition, the cylinder being closable on both ends with covers, and removable assemblies of hydrocyclone blocks and inserts are exclusively clamped in position by the covers, the feed as well as the discharge of the overflow and drain fractions taking place via a system of conduits formed in the transverse partition. The covers can be clamped in position by nuts engaging with a central, two-part shaft extending through the entire multi-hydrocyclone and the covers may be provided with suspension eyes making rapid disassembly for inspection and replacement possible.

BRIEF DESCRIPTION OF THE DRAWINGS

Various embodiments of the invention will now be described in more detail, by way of example, with reference to the accompanying drawings.

DETAILED DESCRIPTION OF THE INVENTION

Figure 1:
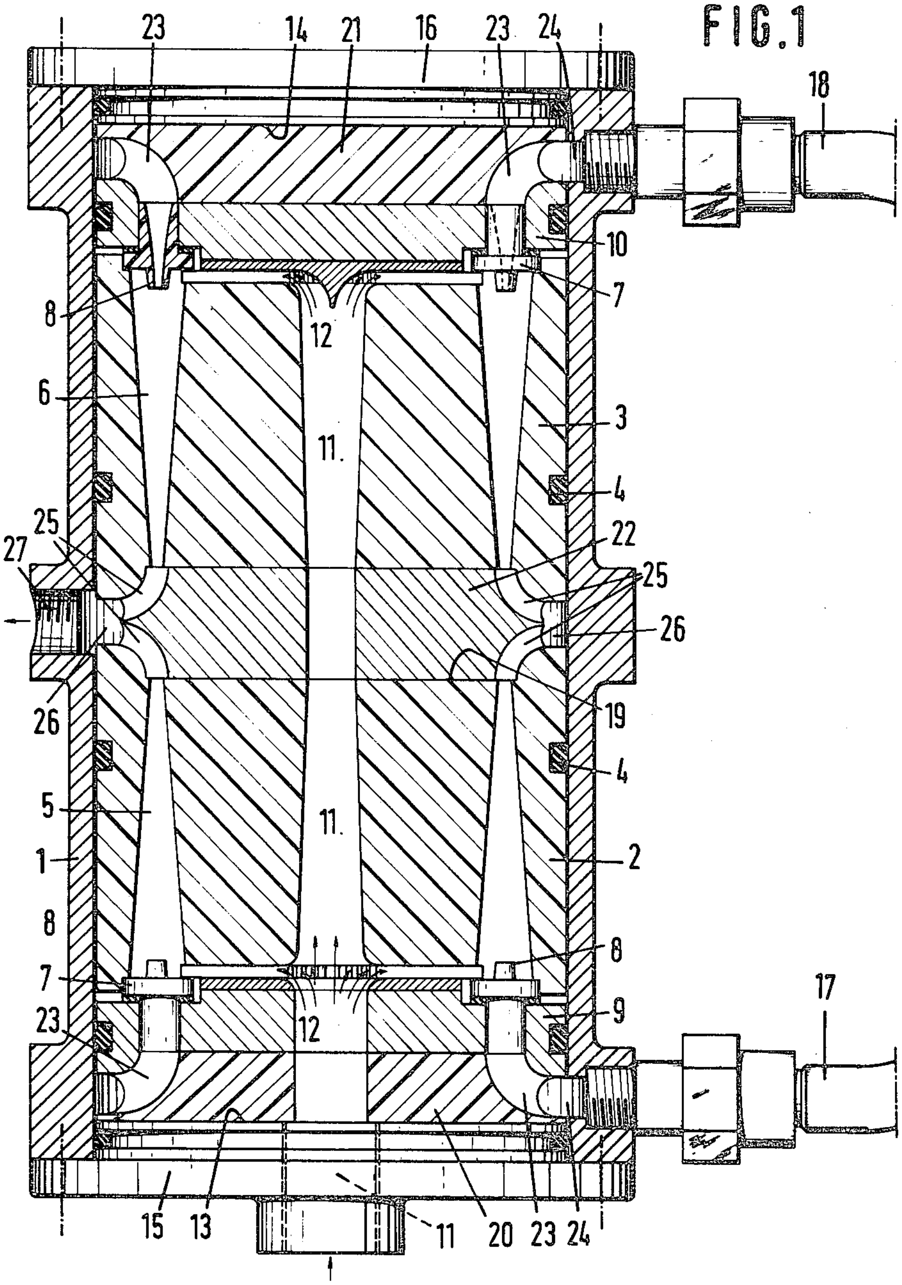
FIG. 1 is an axial section of a first embodiment of a multihydrocyclone according to the invention.

In the embodiment shown in FIG. 1 a housing 1 includes two blocks 2 and 3 with parallel-connected multihydrocyclone blocks with gaskets 4. The blocks 2 and 3 can be manufactured of a polymer containing the usual additives and fillers, for example polyurethane with a filler.

In each of the blocks 2 and 3 a concentric row of hydrocyclones 5, 6 is disposed in an otherwise known manner. At the wide end of the funnel each hydrocyclone is confined by a cover plate 7 with a central overflow pipe 8, the cover plates 7 being fixed with respect to the respective blocks 2 and 3 by clamping plates 9 and 10, respectively.

The two rows of hydrocyclones are simultaneously fed by a central supply conduit 11 extending through both blocks 2 and 3. At the inlets of the two rows of cyclones substantially radial conduits or feed inlet openings 12 extend from the central supply conduit 11, which conduits 12, as usual, open tangentially into the respective cyclones.

Overflow pipes 8 of the two rows open into overflow headers 13 and 14 located in the housing between clamping plates 9 and 10, on the one hand, and covers 15 and 16 of housing 1, on the other. Overflow outlet discharges 17 and 18 for the overflow fraction link up with overflow headers 13 and 14, respectively.

The drains, i.e. the discharge openings adjacent the narrow ends of the cyclones, terminate into a drain header 19 which in this case, with parallel-connected multihydrocyclones, is a chamber common to both rows. To prevent the respective fractions when issuing from the cyclones from being subject to a sudden reduction in flow velocity in the headers 13, 14 and 19 and to prevent the formation of deposits or foulings, inserts 20, 21 and 22 are arranged in the overflow headers 13 and 14 and in the common drain header 19. In the inserts 20 and 21 discharge conduits 23 are provided which are connected to the respective overflow pipes 8 and terminate into a collecting conduit 24 extending along the periphery of each insert 20, 21. Each conduit 24 is bounded on the one hand by a recess in the insert 20 or 21 and on the other hand by a recess in the housing 1 in such a manner that the recess in the housing has the greatest depth adjacent the connection of the discharge conduits 17 and 18 and is minimal diametrically opposite thereto, for example reduced to nil. Thus it is achieved that in this discharge conduit a constant, optimum flow velocity can be maintained.

In the drain or collecting chamber 19 there is provided an insert 22 in which channels or discharge conduits 25 are provided which connect with the respective drains and which are partly bounded by parts of blocks 2 and 3. Conduits 25 terminate into a common collecting conduit 26 extending along the periphery of insert 22, which conduit is formed on the radial outside by an eccentric recess formed in the housing 1, again in such a manner that the throughflow area of collecting conduit 26 is maximal adjacent the drain outlet discharge connection 27 for a discharge conduit from the header 19 and is minimal diametrically opposite thereto.

By virtue of the use of inserts 20, 21 and 22, which can be manufactured in a simple manner, for instance of polyurethane, foulings and cloggings and hence compulsory inoperative periods are avoided or at any rate minimized.

Figure 2:
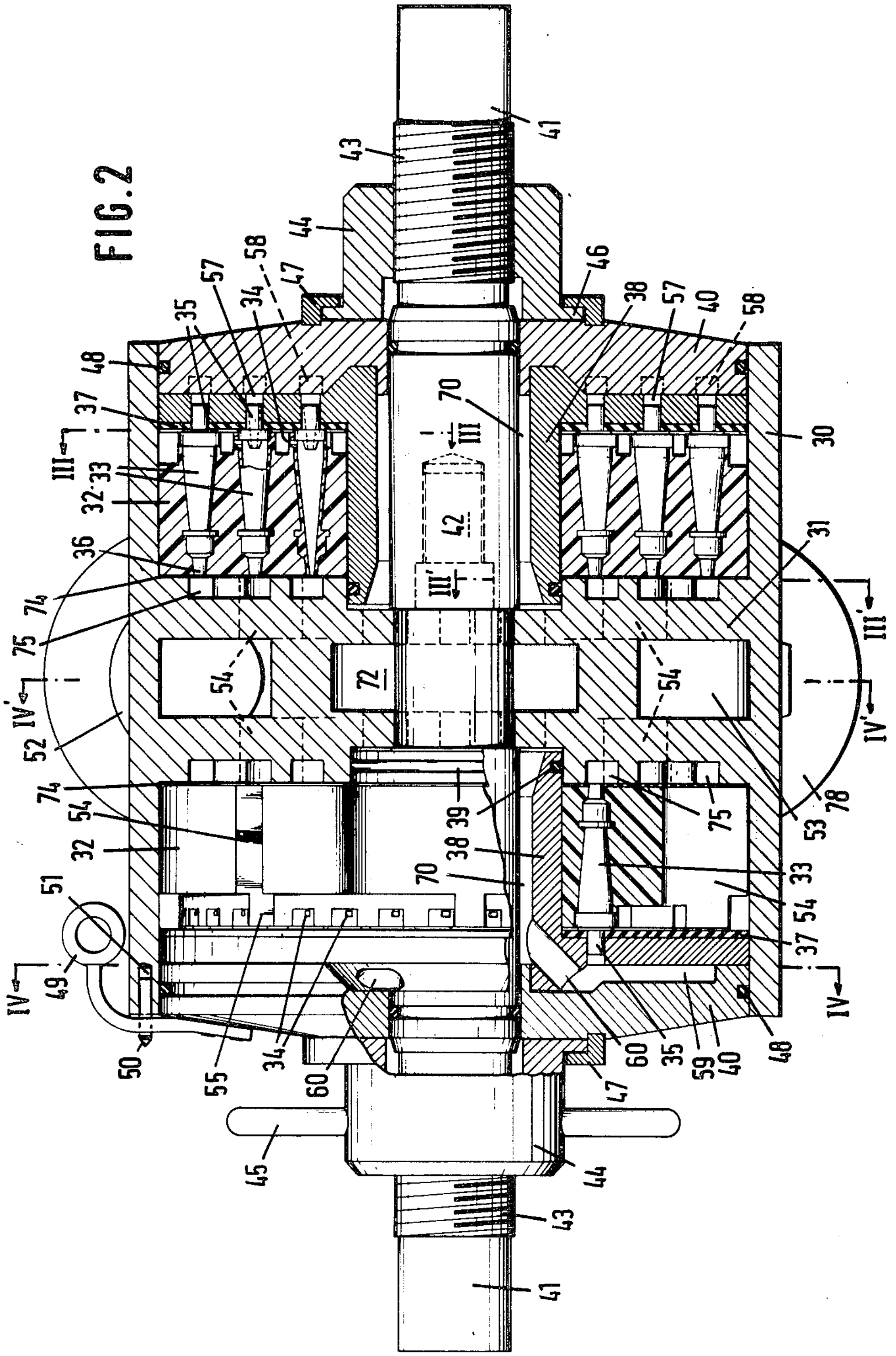
FIG. 2 is a partial section of a preferred embodiment of the multihydrocyclone in which in the left-hand bottom quadrant the sectional plane is swivelled 45° about the axis of the housing with respect to the right-hand portion of FIG. 2, and in which the left-hand upper quadrant illustrates the interior of the housing in elevation.
Figure 3:
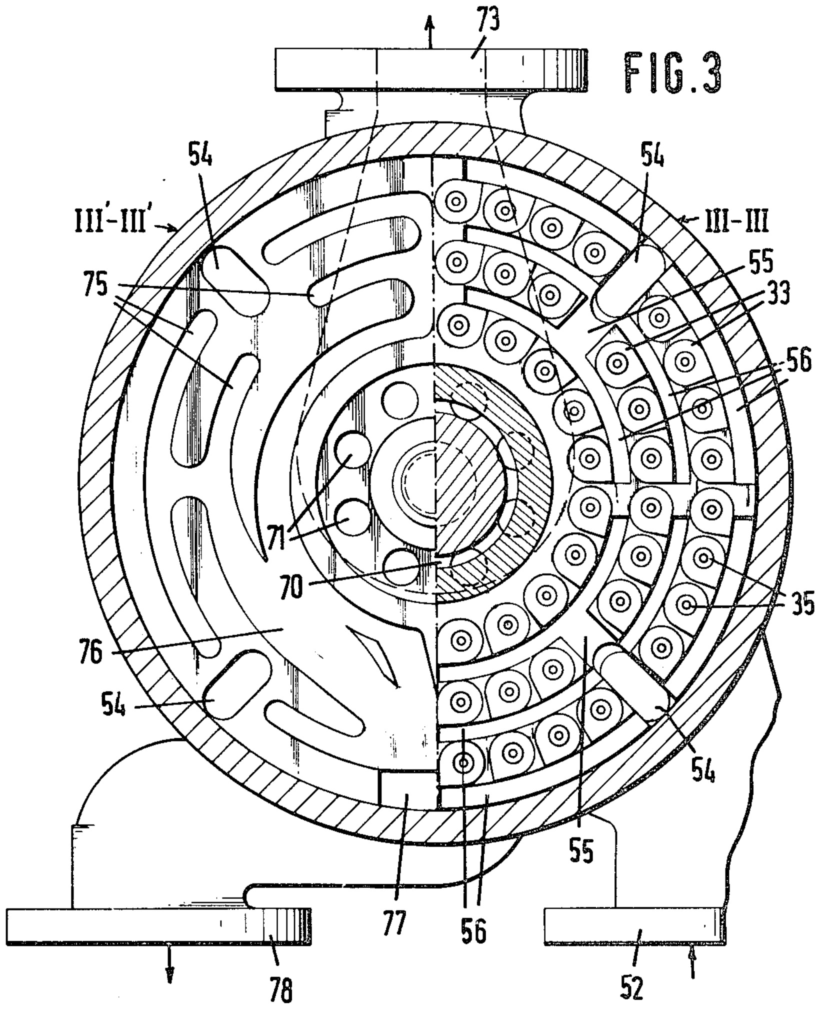
FIG. 3 is a vertical cross-section, in the right-hand half along the arrows III-III and in the left-hand half along the arrows III'—III' in FIG. 2.
Figure 4:
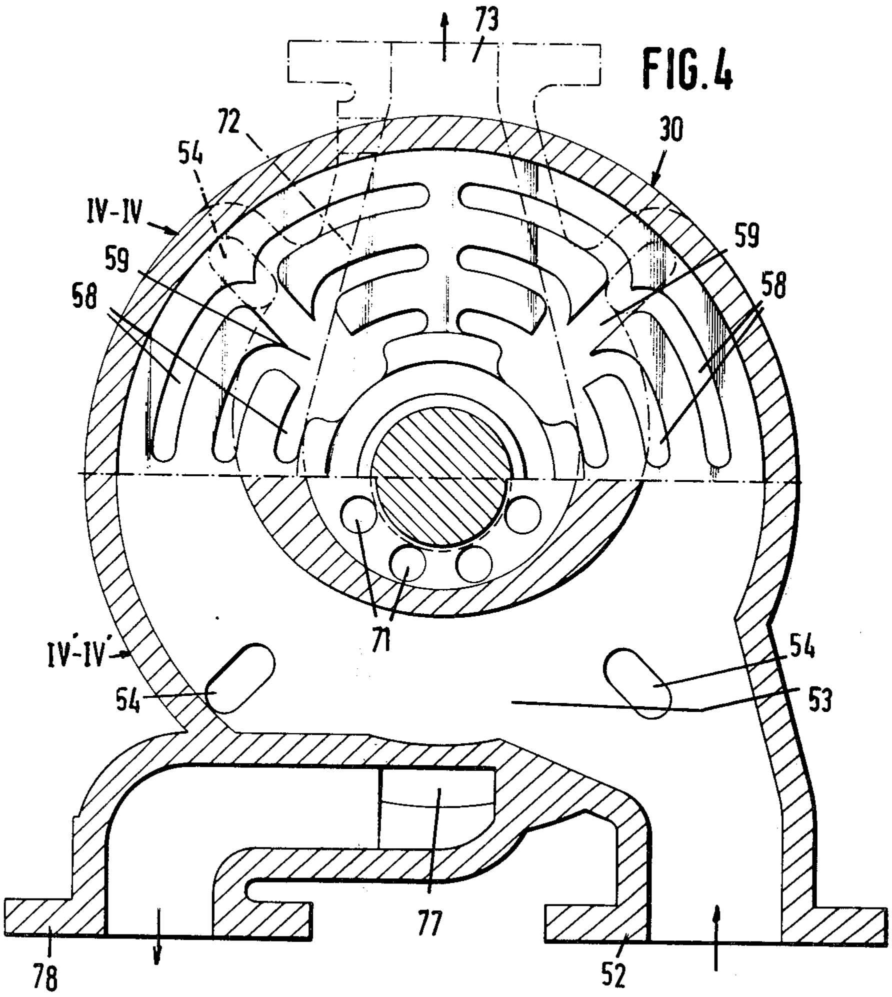
FIG. 4 is a vertical cross-section, in the upper half along the line IV—IV and in the lower half along the line IV'—IV' in FIG. 2.

In the preferred embodiment shown in FIG. 2, 3 and 4, a housing 30, which is generally cylindrical and has a central transverse partition 31, accommodates two cyclone blocks 32. Each cyclone block 32 is provided with a number of concentric rows of hydrocyclones 33, each conventionally provided with a tangential inlet 34, an overflow pipe 35 and a bottom drain 36.

Each cyclone block is formed as a unit with the interposition of a head gasket 37 with passages for the respective overflow pipes 35, each unit being connected to an insert 38, a cover 40 and to a nut 44 via a flanged ring 47 and an end flange 46. The assemblies of cyclone blocks 32 and inserts 38, which inserts consist of a plate-shaped radial portion and a substantially cylindrical axial portion, are fixed in housing 30 with the interposition of a gasket 39 by being clamped between, on the one hand, central transverse partition 31 and, on the other hand, outer or end covers 40.

Covers 40 are kept in position in the following way. A central shaft 41 extends along the axis of the housing 30. Shaft 41 consists of two parts and has a connection 42, so that the parts of shaft 41 can be removed from the housing on both sides thereof. Nut 44, having a handle 45, engages with a threaded portion 43 of shaft parts 41. Nuts 44 engage with radial end flange 46 below flanged ring 47 which is secured to the cover 40. When nut 44 is tightened by means of handle 45 the cover is consequently urged into the housing and seals it in a liquid-tight manner by means of seals 48.

To disassemble a unit it is sufficient to loosen the nuts 44. As a result, the whole assembly, i.e., with the cyclone blocks, comes out and can simply be replaced by a spare unit. For easy handling of the covers they can each be provided with a suspension clip 49 attached to a dowel pin 50 accommodated in a recess 51 in housing 30. Thus a rapid arrangement in the correct angular position of cover 40 is possible. It is clear that the unit of cyclone block 32 and insert 38 can be simply removed from the multihydrocyclone for inspection and cleaning purposes.

This removal of cyclone blocks via the axial ends of the cylindrical housing is possible because the supply and the discharge of the overflow fraction and the drain fraction take place via a system of conduits in the transverse partition 31. The feed circuit, the overflow circuit and the drain circuit will now be successively described.

From an inlet supply or branch 52 with a coupling flange the feed reaches a central distribution conduit 53, from which four axial supply conduits 54 extend through the transverse partition 31 to either side thereof. The axial conduits 54 also extend through the cyclone blocks 32 (see FIG. 3) and terminate at the end of each cyclone block resting against head gasket 37. At this level, from the mouth of the conduits 54 radial supply conduits 55 extend and from these conduits 55 tangential supply conduits 56 extend peripherally, which conduits 56 each serve groups of hydrocyclones. Width and depth of the radial supply conduits 55 and of the tangential supply conduits 56 are always such that the resistance experienced by the respective partial flow is about equal in each position, so that also the flow velocities of the feed flows are equal for each hydrocyclone.

The overflow fraction or portion of feed issuing from overflow pipes 35 reaches in the first instance discharge conduits 57 formed for each overflow pipe in the insert 38. The discharge conduits 57 open groupwise into tangential collecting conduits 58 formed in cover 40. Also these conduits have such a width/depth ratio that the resistance experienced by the overflow stream has the same value in each position. For the pattern of collecting conduits 58 reference is made to the upper part of FIG. 4. The collecting conduits 58 open groupwise into radial collecting conduits 59 which via an inclined passage 60 reaches an axial annular conduit 70 bounded on the outside by the tubular portion of the insert 38 and on the inside by the shaft 41. Via a circumferentially spaced series of axial passages 71 in the transverse partition 31 the overflow fraction can reach a central collecting chamber 72 for the overflow fraction. From that position this fraction reaches a flanged overflow outlet discharge branch 73, which is provided for the purpose of discharge of the overflow (see FIG. 4, upper part).

Finally the drain openings 36 of the cyclones 33 open through an end gasket 74 into discharge conduits 75 formed in the side of the central transverse partition 31 of the cyclone housing 30 covered by the end gasket 74.

As appears from the left-hand side of FIG. 3 the discharge conduits 75 for the respective rows of cyclones open into collecting conduits 76 which terminate into a passage 77 to a drain outlet discharge branch 78 having a coupling flange.

Feed, drain and overflow are therefore located in the central part of the multihydrocyclone and it is possible to remove the cyclone blocks from the ends of the device in a simple and rapid manner for cleaning and inspection. As the overflow fraction is the lightest fraction, the respective branch 73, in case of a horizontal arrangment of the cyclindrical housing 30, is mounted at the top (see FIG. 4). The branches for the feed supply and the drain discharge are located at the bottom.

I claim:

1. A multihydrocyclone system comprising:

a housing assembly having opposite ends;

first and second multihydrocyclone units positioned within said housing assembly, each said multihydrocyclone unit having therein a plurality of parallel hydrocyclones, each said hydrocyclone of each said multihydrocyclone unit having a feed inlet opening adjacent a first end thereof, an overflow outlet extending from said first end thereof, and a drain outlet at a second end thereof, the drain outlets of the hydrocyclones of said first multihydrocyclone unit facing the drain outlets of the hydrocyclones of said second multihydrocyclone unit;

a drain header space defined within said housing assembly between said first and second multihydrocyclone units;

a drain insert completely filling said drain header space;

means for covering said opposite ends of said housing assembly and for defining therein respective overflow header spaces with respective overflow outlet ends of said first and second multihydrocyclone units;

overflow inserts completely filling said overflow header spaces;

inlet supply means extending into said housing assembly for supplying feed through said feed inlet openings and into the respective said hydrocyclones, a first portion of the feed in each said hydrocyclone exiting therefrom through said overflow outlet thereof, and a second portion of the feed in each said hydrocyclone exiting therefrom through said drain outlet thereof;

overflow outlet discharge means leading from said housing assembly for removing said first feed portions;

first conduit means, extending from said overflow outlets to said overflow outlet discharge means, for passing said first feed portions from said overflow outlets to said overflow outlet discharge means at substantially uniform and unreduced rates of flow, said first conduit means comprising first discharge conduits one each extending throughout the entire length thereof from a respective of said overflow outlets through a respective said overflow insert, and first collecting conduit means extending from said first discharge conduits to said overflow outlet discharge means, said first collecting conduit means having throughflow areas dimensioned to substantially avoid any reduction in average flow velocity of said first feed portions from said first discharge conduits to said overflow outlet discharge means, said first collecting conduit means comprising annular recesses jointly formed in said housing assembly and in respective of said overflow inserts;

drain outlet discharge means leading from said housing assembly for removing said second feed portions; and second conduit means, extending from said drain outlets to said drain outlet discharge means, for passing said second feed portions from said drain outlets of both said first and second multihydrocyclone units to said drain outlet discharge means at substantially uniform and unreduced rates of flow, said second conduit means comprising second discharge conduits one each extending throughout the entire length thereof from a respective of said drain outlets through said drain insert, and a second collecting conduit means extending from said second discharge conduits to said outlet discharge means, said second collecting conduit means having throughflow areas dimensioned to substantially avoid any reduction in average flow velocity of said second feed portions from said second discharge conduits to said drain outlet discharge means, said second collecting conduit means comprising an annular recess jointly formed in said housing assembly and in said drain insert.

2. A system as claimed in claim 1, wherein said drain outlet discharge means comprises a single coupling connection extending into said housing assembly.

3. A system as claimed in claim 1, wherein those portions of said annular recesses which are formed in said housing assembly and which form said first collecting conduit means have a maximum dimension adjacent said overflow outlet discharge means and a minimum dimension diametrically opposite thereto, and that portion of said annular recess which is formed in said housing assembly and which forms said second collecting conduit means has a maximum dimension adjacent said drain outlet discharge means and a minimum dimension diametrically opposite thereto.

* * * * *